(12) United States Patent
Kamiya (10) Patent No.: US 9,469,265 B2
(45) Date of Patent: Oct. 18, 2016

(54) CRUSH BOX

(71) Applicant: Keisuke Kamiya, Toyota (JP)

(72) Inventor: Keisuke Kamiya, Toyota (JP)

(73) Assignee: Toyoda Iron Works Co., Ltd., Toyota-shi, Aichi (JP)

( * ) Notice: Subject to any disclaimer, the term of this patent is extended or adjusted under 35 U.S.C. 154(b) by 0 days.

(21) Appl. No.: 14/896,227

(22) PCT Filed: Sep. 20, 2013

(86) PCT No.: PCT/JP2013/075583
§ 371 (c)(1),
(2) Date: Dec. 4, 2015

(87) PCT Pub. No.: WO2014/196093
PCT Pub. Date: Dec. 11, 2014

(65) Prior Publication Data
US 2016/0129866 A1    May 12, 2016

(30) Foreign Application Priority Data

Jun. 6, 2013   (JP) .................................. 2013-119474

(51) Int. Cl.
*B60R 19/34*   (2006.01)
*B60R 19/02*   (2006.01)

(52) U.S. Cl.
CPC ............. *B60R 19/34* (2013.01); *B60R 19/023* (2013.01)

(58) Field of Classification Search
CPC ........................ B60R 19/34; B60R 2021/0023
USPC ......................................... 293/133; 296/187.1
See application file for complete search history.

(56) References Cited

U.S. PATENT DOCUMENTS

| | | | |
|---|---|---|---|
| 8,469,416 B2 * | 6/2013 | Haneda | F16F 7/12 293/133 |
| 2002/0063433 A1 | 5/2002 | Gotanda et al. | |

(Continued)

FOREIGN PATENT DOCUMENTS

| | | |
|---|---|---|
| DE | 195 40 787 A1 | 5/1997 |
| JP | 2002-155981 | 5/2002 |
| JP | 2006-327463 | 12/2006 |

OTHER PUBLICATIONS

Notification of Reasons for Refusal mailed Oct. 13, 2015, in corresponding Japanese patent application No. 2013-119474.

*Primary Examiner* — Gregory Blankenship
(74) *Attorney, Agent, or Firm* — Finnegan, Henderson, Farabow, Garrett & Dunner, LLP (57) ABSTRACT

A crush box, which has a tubular body having a plurality of flat plate-shape sidewalls and having a polygonal shape in section, which is disposed in such an attitude that an axial direction of the tubular body matches a longitudinal direction of a vehicle, and which, when subjected to a compressive load in the axial direction, is crushed like an accordion in the axial direction to absorb impact energy, the crush box being configured such that a plurality of flanges projecting outward from the tubular body are provided along only a plurality of outer ridges located on an outer side in a lateral direction of the vehicle out of a plurality of ridges located along a boundary between the plurality of sidewalls, such that the plurality of flanges extend along an entire axial length of the tubular body, the tubular body is formed by a pair of body halves divided by a pair of upper and lower outer ridges located at upper and lower positions on the outer side in the lateral direction of the vehicle out of the plurality of ridges located along the boundary between the plurality of sidewalls, each of the pair of body halves has joint portions at its both ends located along the pair of upper and lower outer ridges, the joint portions are placed on each other and bonded together and project outward from the tubular body, and a pair of upper and lower flanges functioning as the plurality of flanges are formed by the joint portions, and the upper flange is provided so that the upper flange projects obliquely upward and outward in the lateral direction of the vehicle in section perpendicular to the axial direction of the tubular body, and the lower flange is provided so that the lower flange projects obliquely downward and outward in the lateral direction of the vehicle in section perpendicular to the axial direction of the tubular body.

4 Claims, 7 Drawing Sheets

(56) References Cited

U.S. PATENT DOCUMENTS

| | | | |
|---|---|---|---|
| 2005/0151792 A1* | 7/2005 | Niimi | B41J 2/2107 347/43 |
| 2007/0056819 A1* | 3/2007 | Kano | F16F 7/12 188/371 |
| 2010/0164238 A1* | 7/2010 | Nakanishi | F16F 7/12 293/132 |
| 2011/0187135 A1* | 8/2011 | Kano | B60R 19/34 293/133 |
| 2012/0175916 A1* | 7/2012 | Rawlinson | B62D 21/152 296/203.02 |
| 2013/0099514 A1* | 4/2013 | Kaneko | B60R 19/34 293/133 |
| 2015/0021940 A1* | 1/2015 | Roselli | B60R 19/34 293/133 |
| 2016/0001725 A1* | 1/2016 | Nakanishi | B60R 19/34 293/133 |
| 2016/0001726 A1* | 1/2016 | Keller | B60R 19/34 188/377 |
| 2016/0121829 A1* | 5/2016 | Murata | B60R 19/34 293/133 |
| 2016/0129866 A1* | 5/2016 | Kamiya | B60R 19/34 293/133 |

* cited by examiner

| SAMPLE | α | β | EVALUATION |
|---|---|---|---|
| No1 | 120° | 15° | CAPABILITY DECREASED IN LATTER HALF OF CRUSHING |
| No2 | 105° | 30° | NO LATERAL BUCKLING |
| No3 | 90° | 45° | NO LATERAL BUCKLING |
| No4 | 75° | 60° | NO LATERAL BUCKLING |
| No5 | 67.5° | 67.5° | NO LATERAL BUCKLING |
| No6 | 60° | 75° | LATERAL BUCKLING |

CRUSH BOX

CROSS-REFERENCE TO RELATED APPLICATIONS

This application is a national phase application of International Application No. PCT/JP2013/075583, filed Sep. 20, 2015, and claims the priority of Japanese Application No. 2013-119474, filed Jun. 6, 2015, the content of both of which is incorporated herein by reference.

TECHNICAL FIELD

The present invention relates to crush boxes, and more particularly to a technique of improving impact energy absorption capability in the case where the crush box is subjected to an impact load applied obliquely from the front of a vehicle or obliquely from the rear of the vehicle.

BACKGROUND ART

Crush boxes are known in the art which have a tubular body having a plurality of flat plate-shape sidewalls and having a polygonal shape in section, which are disposed in such an attitude that the axial direction of the tubular body matches the longitudinal direction of a vehicle, and which, when subjected to a compressive load in the axial direction, are crushed like an accordion in the axial direction to absorb impact energy. A device described in Patent Document 1 is an example of such a crush box. In this device, a plurality of flanges are provided on the outer peripheral surface of a tubular body so as to extend in the axial direction of the tubular body.

RELATED ART DOCUMENT

Patent Document

Patent Document 1: Japanese Patent Application Publication No. 2002-155981

SUMMARY OF THE INVENTION

Problem to be Solved by the Invention

Figure 4:
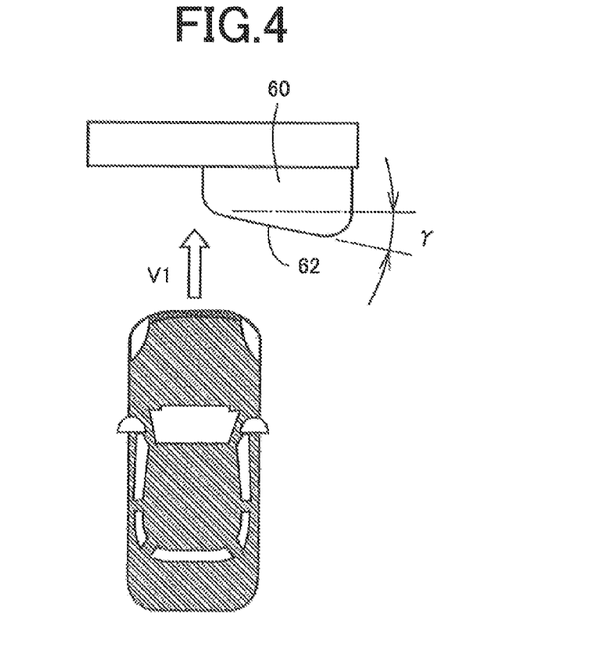
FIG. 4 is a diagram illustrating an offset crash test in which an impact load is applied to a vehicle obliquely in the lateral direction of the vehicle.

However, even the crush box having such flanges tends to be laterally buckled in, e.g., an offset crash shown in FIG. 4, which may reduce impact energy absorption capability. That is, in the example of FIG. 4, the crush box on the right side of a vehicle is subjected to an impact load applied obliquely from the right front side. For example, the crush box is therefore subjected to moment loads Ma, Mb based on an impact load F as shown in FIGS. 9 and 10, and therefore may be laterally buckled toward the inside of the vehicle (leftward in FIGS. 9 and 10).

Figure 9:
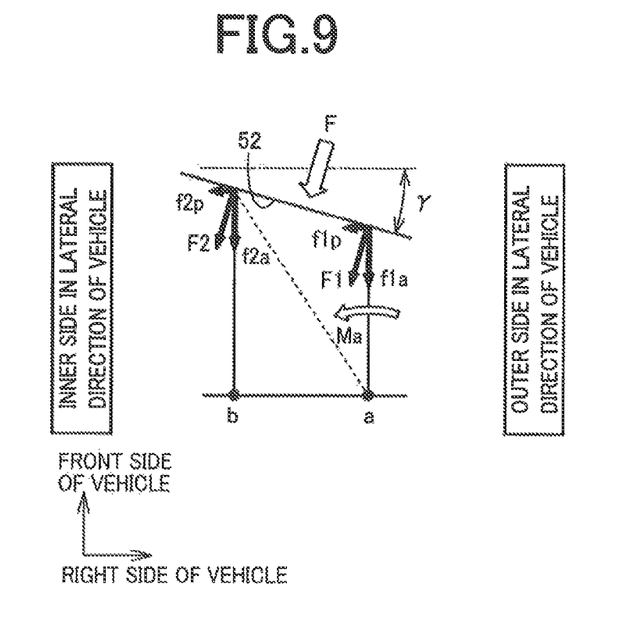
FIG. 9 is a diagram showing a load applied to each part of a crush box as viewed from above, illustrating a moment load Ma about a support point a located on the outer side in the lateral direction of the vehicle, which is applied based on an impact load F at the time of an offset crash.
Figure 10:
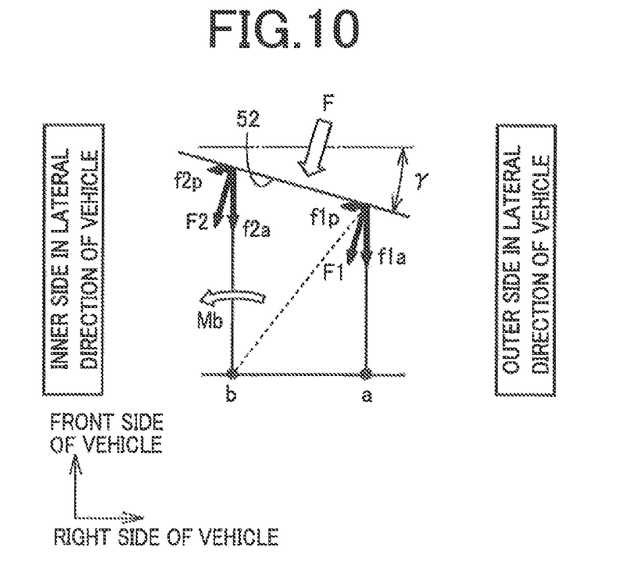
FIG. 10 is a diagram illustrating a moment load Mb about a support point b located on the inner side in the lateral direction of the vehicle in FIG. 9.

FIGS. 9 and 10 are diagrams illustrating an input load that is applied to the crush box as viewed from above. A point a is a support point on the base end side of the crush box, which is an outer support point located on the outer side in the lateral direction of the vehicle. A point b is a support point on the base end side of the crush box, which is an inner support point located on the inner side in the lateral direction of the vehicle. Loads F1, F2 are input loads that are applied to the surface located in front of the support points a, b in the axial direction. As shown in FIG. 9, both input loads F1, F2 are applied to the support point a in the counterclockwise direction, and a moment load Ma is therefore applied to the support point a in the counterclockwise direction. An axial component $f1a$ of the input load F1 is not involved in the moment load Ma, but all of other axial components $f1p$, $f2a$, $f2p$ are applied to the support point a in the counterclockwise direction. As shown in FIG. 10, the input load F2 is applied to the support point b in the counterclockwise direction, but the input load F1 is applied to the support point b in the clockwise direction. A moment load Mb is determined by the resultant force of the input loads F1, F2. The axial component $f2a$ of the input load F2 is not involved in the moment load Mb, but the axial component $f1a$ of the input load F1 is applied to the support point b in the clockwise direction, and the components $f1p$, $f2p$ at right angles to the axial direction are applied to the support point b in the counterclockwise direction. That is, the moment load Mb is sometimes applied in the clockwise direction depending on the distance between the support points a, b or the barrier angle $\gamma$ (Mb<0). However, the magnitude of the moment load Mb is sufficiently smaller than that of the moment load Ma, and the overall moment load to the crush box including the support points a, b is applied in the counterclockwise direction. In Patent Document 1, the plurality of flanges are provided on the outer surface of the tubular body. However, these flanges are provided substantially symmetrically on the right and left sides of the tubular body in the lateral direction of the vehicle. This merely increases rigidity in the axial direction, and cannot reduce the above moment load arising from the impact load F applied in the oblique direction.

The present invention was developed in view of the above circumstances, and it is an object of the present invention to improve resistance to lateral buckling of a crush box under an impact load that is applied obliquely in the lateral direction of a vehicle, and thus to more stably obtain impact energy absorption capability.

Means for Solving the Problem

To achieve the above object, a first aspect of the invention provides a crush box, which has a tubular body having a plurality of flat plate-shape sidewalls and having a polygonal shape in section, which is disposed in such an attitude that an axial direction of the tubular body matches a longitudinal direction of a vehicle, and which, when subjected to a compressive load in the axial direction, is crushed like an accordion in the axial direction to absorb impact energy, the crush box characterized in that a plurality of flanges projecting outward from the tubular body are provided along only a plurality of outer ridges located on an outer side in a lateral direction of the vehicle out of a plurality of ridges located along a boundary between the plurality of sidewalls, such that the plurality of flanges extend along an entire axial length of the tubular body.

A second aspect of the invention provides the crush box recited in the first aspect of the invention, characterized in that (a) the tubular body is formed by a pair of body halves divided by a pair of upper and lower outer ridges located at upper and lower positions on the outer side in the lateral direction of the vehicle out of the plurality of ridges located along the boundary between the plurality of sidewalls, and (b) each of the pair of body halves has joint portions at its both ends located along the pair of upper and lower outer ridges, the joint portions are placed on each other and bonded together and project outward from the tubular body, and a pair of upper and lower flanges functioning as the plurality of flanges are formed by the joint portions.

A third aspect of the invention provides the crush box recited in the first or second aspect of the invention, characterized in that (a) the tubular body has the pair of upper and lower flanges functioning as the plurality of flanges, the pair of upper and lower flanges are provided along the pair of upper and lower outer ridges located at the upper and lower positions on the outer side in the lateral direction of the vehicle out of the plurality of ridges located along the boundary between the plurality of sidewalls, (b) the upper flange has an angle of more than 60° with respect to each of a pair of sidewalls adjoining each other with the upper outer ridge interposed therebetween and is tilted outward in the lateral direction of the vehicle by 15° or more from a vertical line in a vertical direction of the vehicle so that the upper flange projects obliquely upward and outward in the lateral direction of the vehicle in section perpendicular to the axial direction of the tubular body, and (b) the lower flange has an angle of more than 60° with respect to each of a pair of sidewalls adjoining each other with the lower outer ridge interposed therebetween and is tilted outward in the lateral direction of the vehicle by 15° or more from the vertical line in a vertical direction of the vehicle so that the lower flange projects obliquely downward and outward in the lateral direction of the vehicle in section perpendicular to the axial direction of the tubular body.

A fourth aspect of the invention provides the crush box recited in any one of the first to third aspects of the invention, characterized in that each of the plurality of flanges has a constant projecting dimension along the entire axial length of the tubular body.

A fifth aspect of the invention provides the crush box recited in any one of the first to fourth aspects of the invention, characterized in that (a) the tubular body has, in section perpendicular to the axial direction of the tubular body, a flattened octagonal shape that is long in the vertical direction of the vehicle, and has a pair of wide sidewalls located on right and left sides in the lateral direction of the vehicle so as to be parallel to each other, and the pair of wide sidewalls have grooves that are symmetrically recessed inward of the tubular body and that extend parallel to the axial direction of the tubular body, and (b) the plurality of flanges are provided along the pair of upper and lower outer ridges located outside a pair of narrow sidewalls in the lateral direction of the vehicle, and the pair of narrow sidewalls are located at upper and lower ends of the tubular body having the octagonal shape in section and extend parallel to each other.

Effects of the Invention

In the crush box as described above, the flanges are provided along only the outer ridges in the lateral direction of the vehicle out of the plurality of ridges of the tubular body so as to extend along the entire axial length of the tubular body. The tubular body therefore has higher rigidity against a compressive load in its outer part in the lateral direction of the vehicle. This reduces the moment load that is applied inward in the lateral direction of the vehicle and reduces lateral buckling of the crush box even in the case of an offset crash in which the impact load is applied to the vehicle obliquely from the outside. Excellent impact energy absorption capability can therefore be stably obtained.

This will be described specifically with reference to FIGS. 9 and 10. Since the crush box has higher rigidity in its outer part in the lateral direction of the vehicle, the input load F1 becomes larger than the input load F2. In particular, an axial component f1a of the input load F1 is increased. The axial component f1a is applied as a moment in the clockwise direction to the inner support point b in the lateral direction of the vehicle. This reduces the moment load Mb in the counterclockwise direction which is applied to the support point b, or results in the negative moment load Mb so that a moment load in the clockwise direction is applied to the support point b. The moment load Ma in the counterclockwise direction which is applied to the outer support point a in the lateral direction of the vehicle is somewhat increased by an increase in component f1p in a direction perpendicular to the axial direction. However, the change in component f1p is smaller than that in axial component f1a, and the influence of the axial component f1a increases as being closer to the support point b on the region between the support point a and the support point b. Accordingly, the moment load in the counterclockwise direction is reduced as a whole, whereby lateral buckling of the crush box is suppressed.

In the second aspect of the invention, the tubular body is formed by the pair of body halves, and the pair of upper and lower flanges functioning as the plurality of flanges are formed by the joint portions provided at both ends of each of the pair of body halves. The tubular body having the plurality of flanges can therefore be easily produced at low cost by press work, welding, etc. In this case, the limitations on materials and shapes are less than those in the case where the tubular body is produced by extrusion molding, and the material yield is improved as compared to the case where the flanges are fixedly attached later by welding etc.

In the third aspect of the invention, each of the pair of upper and lower flanges has an angle of more than 60° with respect to the pair of sidewalls adjoining each other with the ridge interposed therebetween, and is tilted outward in the lateral direction of the vehicle by 15° or more from the vertical line in the vertical direction of the vehicle. This can appropriately ensure impact energy absorption capability by crushing of the tubular body and can improve the resistance to lateral buckling. That is, providing the pair of upper and lower flanges may hinder crushing of the tubular body and thus may reduce impact energy absorption capability. However, since the flanges are provided at the above angles, the influence of the flanges on crushing characteristics of the tubular body can be reduced.

In the fourth aspect of the invention, the projecting dimension of the plurality of flanges is constant along the entire axial length of the tubular body. This allows the tubular body to have higher rigidity in its outer part in the lateral direction of the vehicle, and thus can appropriately improve the resistance to lateral buckling.

In the case where the tubular body recited in the fifth aspect of the invention has a flattened octagonal shape in section and has the grooves in the pair of right and left wide sidewalls, the plurality of flanges are provided along the pair of upper and lower outer ridges located outside the pair of narrow sidewalls at the upper and lower ends in the lateral direction of the vehicle. This can appropriately ensure impact energy absorption capability by crushing of the tubular body and can improve the resistance to lateral buckling. That is, providing the plurality of flanges may hinder crushing of the tubular body and thus may reduce impact energy absorption capability. However, since the flanges are provided along the ridges located at the upper and lower ends separated from the grooves to be involved in the crushing, the influence of the flanges on crushing characteristics of the tubular body by the grooves can be reduced.

MODES FOR CARRYING OUT THE INVENTION

The crush box of the present invention can be applied to both an attachment portion of a bumper member that is attached to the front of a vehicle and an attachment portion of a bumper member that is attached to the rear of a vehicle, but may be applied to only one of the attachment portions of the bumper members. The crush box is disposed in such an attitude that the axial direction of the tubular body matches the longitudinal direction of the vehicle. However, the axial direction of the tubular body need not necessarily exactly match the longitudinal direction of the vehicle. Depending on the shape of the bumper member etc., the crush box may be disposed in such an attitude that the axial direction of the tubular body is tilted in the lateral direction or in the vertical direction.

For example, the crush box has, in addition to the tubular body, a pair of attachment plates that are fixedly attached to both ends of the tubular body in its axial direction. It is desirable to fixedly attach the plurality of flanges to the attachment plates. For example, the tubular body having a flattened octagonal shape in section is preferably used. However, the tubular body having a polygonal shape other than the octagonal shape in section such as a quadrilateral or hexagonal shape may be used. The tubular body having a polygonal shape in section has the groove recessed inward of the tubular body and extending parallel to the axial direction, as necessary. The number of grooves is decided as appropriate, and a plurality of grooves may be provided in a single sidewall. In the fifth aspect of the invention, the grooves are provided symmetrically. However, the grooves may be provided asymmetrically or may be provided in the upper and lower sidewalls. The groove may be in various forms such as having a V-shape, a U-shape, a semicircular shape, a rectangular shape, or a trapezoidal shape in section. The ridges need not necessarily be literally angular. The tubular body may have curved corners (ridges) such as arc-shaped corners as long as the tubular body generally has a polygonal shape in section.

Such a tubular body may be formed by the pair of body halves divided as in the second aspect of the invention. However, such a tubular body may be molded as a single-piece member including the plurality of flanges by, e.g., extrusion molding a soft metal material such as aluminum or aluminum alloy in the axial direction of the tubular shape. The tubular body may be in various forms. For example, the tubular body may be formed by bending a single thin sheet material into a predetermined polygonal shape in section, placing both edges of the polygonal shape on each other, and bonding the edges together, or forming a pipe material into a predetermined shape, and then fixedly attaching the flanges to the resultant tubular body by welding etc. The tubular body may be formed by using a material other than the metal material, such as fiber reinforced plastic.

In the second aspect of the invention in which the tubular body is formed by the pair of half bodies, the pair of upper and lower flanges are provided. However, when carrying out the first aspect of the invention, three or more flanges may be provided on three or more outer ridge portions. Appropriate means for placing both ends of the pair of half bodies on each other and bonding them together in the second aspect of the invention is spot welding. However, other welding means such as arc welding may be used, or a bonding member such as a rivet may be used to bond the ends of the pair of half bodies together. The ends of the pair of half bodies may be discontinuously bonded at predetermined intervals in the axial direction. In the arc welding, etc., the ends of the pair of half bodies may be continuously bonded in the axial direction. For example, it is desirable that the direction in which the upper and lower flanges project be set as in the third aspect of the invention. However, the direction in which the upper and lower flanges project may be decided as appropriate according to the basic shape of the tubular body, the positions of the ridges along which the flanges are provided, etc. For example, in the case where the tubular body has the pair of upper and lower flanges, the upper and lower flanges are formed so that the sectional shape of the tubular body including the upper and lower flanges, which is perpendicular to the axial direction of the tubular body, is symmetrical in the vertical direction with respect to its centerline. However, the sectional shape of the tubular body including the upper and lower flanges, which is perpendicular to the axial direction of the tubular body, may be asymmetrical with respect to its centerline in the vertical direction. Only the upper and lower flanges may be provided asymmetrically with respect to the centerline of the sectional shape of the tubular body in the vertical direction.

In the fourth aspect of the invention, each of the plurality of flanges has a constant projecting dimension along the entire axial length of the tubular body. However, the projecting dimension may vary in the axial direction of the tubular body. For example, the projecting dimension may be continuously changed linearly or non-linearly so that the flange has a larger projecting dimension in its base end located on the vehicle body side and has a smaller projecting dimension in its tip end located on the bumper member side.

The tubular body of the fifth aspect of the invention has a flattened octagonal shape in section, the upper and lower flanges are provided along the pair of upper and lower outer ridges located outside the pair of narrow sidewalls in the lateral direction of the vehicle, and the pair of narrow sidewalls are located at the upper and lower ends of the tubular body. However, in addition to these flanges or instead of these flanges, upper and lower flanges may be provided along those ridges which are located at both upper and lower ends of the wide sidewalls located on the outer side in the lateral direction of the vehicle.

Embodiment

An embodiment of the present invention will be described in detail below with reference to the accompanying drawings.

Figure 1:
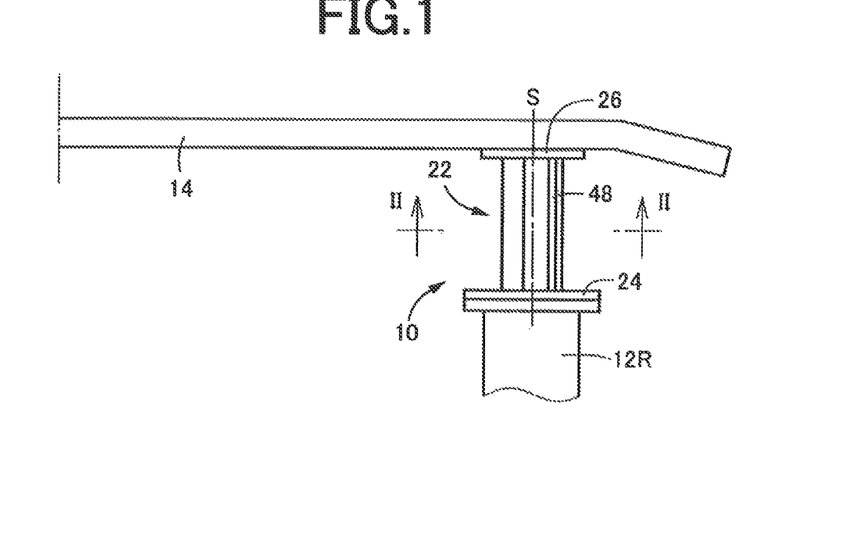
FIG. 1 is a schematic plan view illustrating a crush box that is an embodiment of the present invention, and showing a manner in which the crush box is disposed.

FIG. 1 is a schematic plan view showing a region near a bumper beam 14 located on the front side of a vehicle, as viewed from above. A crush box 10 is disposed and used between a side member 12R and the right end of the bumper beam 14. FIG. 1 is a plan view showing the right half of the vehicle, and the left half of the vehicle is configured symmetrically with the right half with respect to the centerline. The crush box 10 includes a hollow tubular body 22 having a plurality of flat plate-shape sidewalls and having a polygonal section, and a pair of attachment plates 24, 26 fixedly attached to both ends of the tubular body 22 in its axial direction (the direction of an axis S) by welding. The crush box 10 is disposed between the side member 12R and the bumper beam 14 in such an attitude that the axis S of the tubular body 22 extends substantially parallel to the longitudinal direction of the vehicle, and is fixedly attached to the side member 12R and the bumper beam 14 via the attachment plates 24, 26 by bolts etc., not shown. The side member 12R is a member on the vehicle body side, and the bumper beam 14 is a bumper member.

The tubular body 22 is in close contact with the attachment plates 24, 26 along the entire lengths of both edges in the axial direction of the tubular body 22, and is fixedly attached to the attachment plates 24, 26 by arc welding etc. In FIG. 1, both attachment plates 24, 26 are attached in such an attitude that the attachment plates 24, 26 extend substantially perpendicularly to the axis S of the tubular body 22. However, for example, in the case where an attachment portion of the bumper beam 14 is tilted, the edge of the tubular body 22 may be tilted with respect to the axis S, and the attachment plate 26 may be fixedly attached to the tubular body 22 in a tilted attitude so that the attachment plate 26 closely contacts the tilted edge of the tubular body 22. When the crush box 10 is subjected to impact from the front of the vehicle and thus subjected to an axial compressive load, the tubular body 22 of the crush box 10 is crushed like an accordion, and with this deformation, absorbs impact energy to reduce impact on structural members of the vehicle such as the side member 12R. This accordion-like crush is a phenomenon that occurs as the tubular body 22 is continuously buckled (bent into a V-shape) at a multiplicity of positions in the axial direction. The buckling usually starts from the bumper beam 14 side or the input side and proceeds to the vehicle body side with time. The bumper beam 14 functions as a reinforcement (reinforcing member) and an attachment member of a bumper, and a bumper fascia, not shown, which is made of a synthetic resin etc., is fixedly attached to the bumper beam 14.

Figure 2:
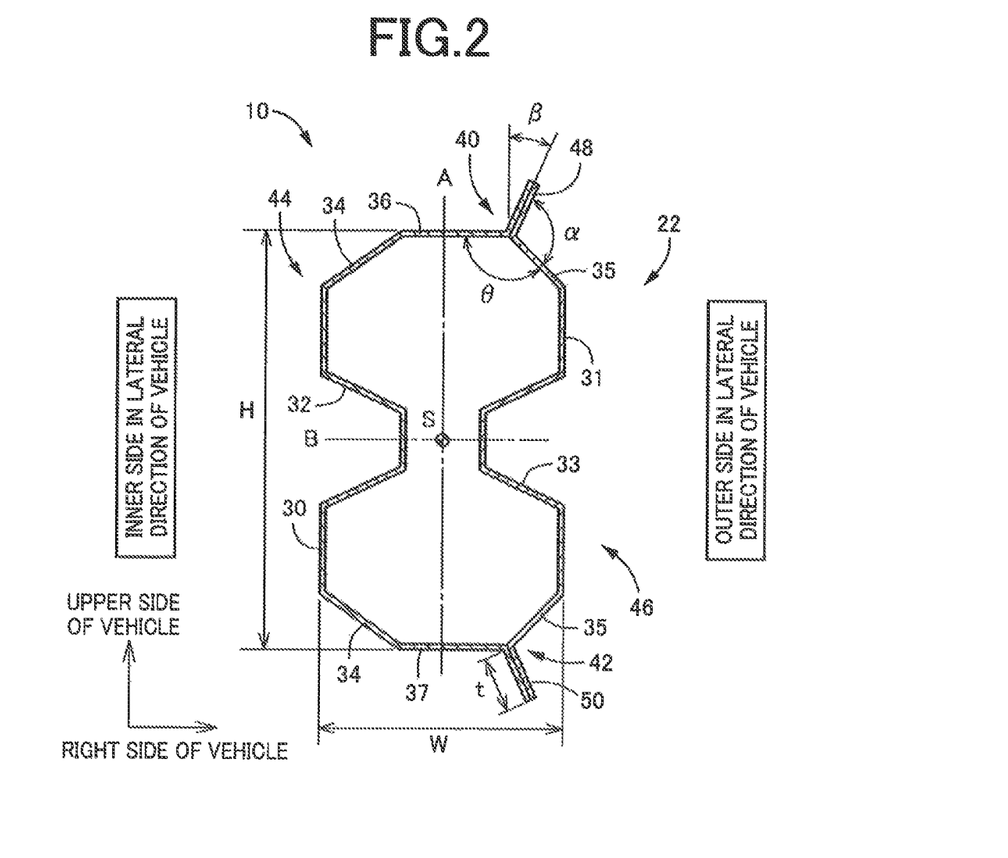
FIG. 2 is an enlarged sectional view taken along and viewed in the direction shown by arrows II-II in FIG. 1, showing a sectional shape perpendicular to the axial direction of the crush box shown in FIG. 1.
Figure 3:
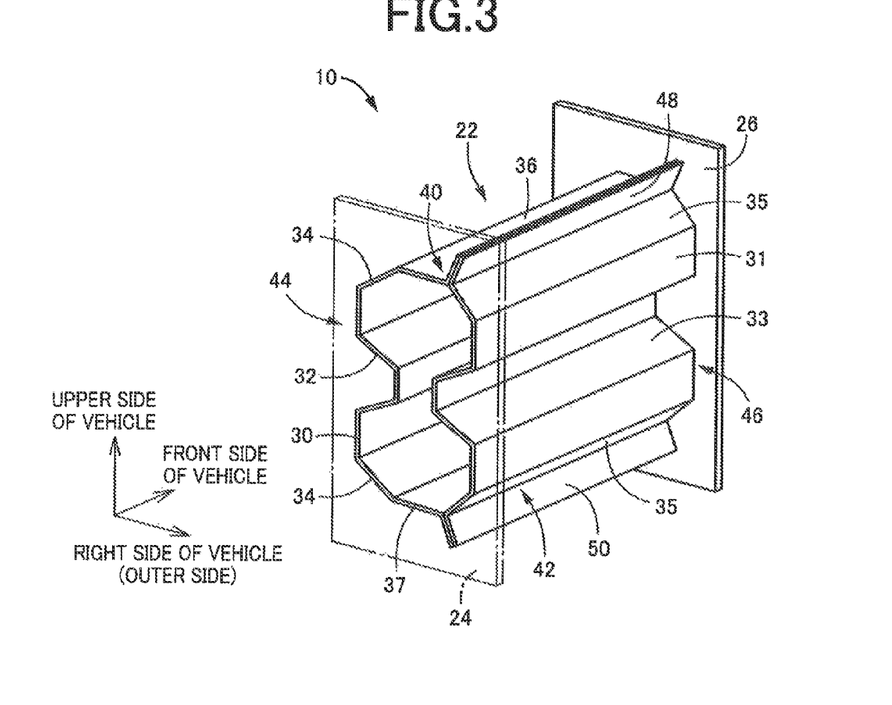
FIG. 3 is a perspective view showing the crush box shown in FIG. 1.

FIG. 2 is an enlarged sectional view taken along and viewed in the direction shown by arrows II-II in FIG. 1, showing a sectional shape perpendicular to the axial direction of the crush box 10. FIG. 3 is a perspective view showing only the crush box 10. The tubular body 22 basically has a flattened polygonal shape that is long in the vertical direction, as viewed in section perpendicular to the axial direction. Specifically, the tubular body 22 basically has an octagonal shape (a vertical rectangle with four chamfered corners) in section. The tubular body 22 thus has a generally 8-shape or gourd shape in section. That is, the tubular body 22 has: a pair of substantially vertical wide sidewalls 30, 31 forming the long sides of the above basic section of the tubular body 22 and extending parallel to each other; four tilted sidewalls 34, 35 tilted obliquely inward from the upper and lower ends of the wide sidewalls 30, 31; and a pair of substantially horizontal narrow sidewalls 36, 37 provided at both ends of the basic section in the longitudinal direction (the direction of a major axis A) so as to extend perpendicularly to the longitudinal direction and parallel to each other, so as to form the short sides of the basic section, and so as to connect the tilted sidewalls 34, 35. A pair of grooves 32, 33 are formed in the middle in the width direction of the wide sidewalls 30, 31, namely at a substantially horizontal minor axis B portion located in the middle in the vertical direction in FIG. 2. The grooves 32, 33 are recessed inward of the tubular shape of the tubular body 22 and symmetrically with respect to the major axis A, that is, symmetrically with respect to the lateral direction. The grooves 32, 33 have a trapezoidal shape in section whose lateral dimension decreases closer to the tip end of the trapezoidal shape, namely closer to the bottom of the groove. The grooves 32, 33 are formed along the entire axial length of the tubular body 22 so as to extend parallel to the axis S. Both the major axis A and the minor axis B are defined based on the sectional shape shown in FIG. 2. The major axis A is a centerline that extends parallel to the wide sidewalls 30, 31 serving as a pair of long sides located on the right and left sides of the sectional shape and that is located in the middle between the wide sidewalls 30, 31. The minor axis B is a centerline that extends parallel to the narrow sidewalls 36, 37 serving as a pair of short sides located at the upper and lower ends of the sectional shape and that is located in the middle between the narrow sidewalls 36, 37. The axis S is the intersection of the major axis A and the minor axis B. In the present embodiment, the tubular body 22 has the same sectional shape of FIG. 2 along the entire length of the direction of the axis S (the axial direction).

The tubular body 22 is divided into two parts by a pair of upper and lower outer ridges 40, 42. The pair of upper and lower outer ridges 40, 42 are provided outside the pair of parallel narrow sidewalls 36, 37 located at the upper and lower ends of the octagonal section, as viewed in the lateral direction of the vehicle. These two parts are a pair of body halves 44, 46 formed by press work. That is, the inner body half 44 as an inner half in the lateral direction of the vehicle is a single-piece part that is formed by the wide sidewall 30 having the groove 32, the pair of tilted sidewalls 34 extending obliquely outward in the lateral direction of the vehicle from the upper and lower ends of the wide sidewall 30, and the pair of narrow sidewalls 36, 37 extending horizontally from the ends of the pair of tilted sidewalls 34. The outer body half 46 as an outer half in the lateral direction of the vehicle is a single-piece part that is formed by the wide sidewall 31 having the groove 33 and the pair of tilted sidewalls 35 extending obliquely inward in the lateral direction of the vehicle from the upper and lower ends of the wide sidewall 31.

Each of the inner body half 44 and the outer body half 46 has joint portions at both ends thereof, namely in the portions forming the ridges 40, 42, and the joint portions are placed on each other and bonded together by spot welding, arc welding, etc. A pair of upper and lower flanges 48, 50 projecting outward from the tubular body 22 are formed by the joint portions. The upper flange 48 and the lower flange 50 are rib-like projecting portions in the shape of a flat plate, and project symmetrically with respect to the minor axis B so that the section of the tubular body 22 has a symmetrical shape with respect to its centerline in the vertical direction. The upper flange 48 and the lower flange 50 are continuously provided along the entire axial length of the tubular body 22 so as to have a constant projecting dimension t. Both axial edges of the upper flange 48 and the lower flange 50 abut on the attachment plates 24, 26 so as to be in close contact therewith, and are fixedly attached to the attachment plates 24, 26 by welding etc. The upper outer ridge 40 and the lower outer ridge 42 correspond to a plurality of outer ridges, and the upper flange 48 and the lower flange 50 correspond to the plurality of flanges.

The upper flange 48 will be specifically described below. In the section shown in FIG. 2, the upper flange 48 has an angle of more than 60° with respect to each of the pair of sidewalls 35, 36 adjoining each other with the ridge 40 interposed therebetween and is tilted outward in the lateral direction of the vehicle by 15° or more from a vertical line in the vertical direction of the vehicle so that the upper flange 48 projects obliquely upward and outward in the lateral direction of the vehicle. That is, an intersection angle α at which the upper flange 48 intersects the tilted sidewall 35 is larger than 60°, and a tilt angle R at which the upper flange 48 is tilted from the vertical line in the vertical direction is equal to or larger than 15°. In the present embodiment, an interior angle θ of the upper outer ridge 40 is θ≈135°, the intersection angle α is α≈105°, and the tilt angle β is β≈30°. An appropriate projecting dimension t is 8 mm or more, and the projecting dimension t is about 12 mm in the present embodiment. The lower flange 50 is shaped symmetrically with the upper flange 48, and the angles and dimensions of each part of the lower flange 50 are the same as those of the upper flange 48. The tubular body 22 has a height dimension H of about 100 mm, a lateral dimension W of about 60 mm, and an axial length of about 140 mm. The pair of body halves 44, 46 have a thickness of about 1.0 mm, and the attachment plates 24, 26 have a thickness of about 2.0 mm. The dimensions, angles, and dimension ratios of each part in FIGS. 1 to 3 are not necessarily shown accurately.

Figure 5:
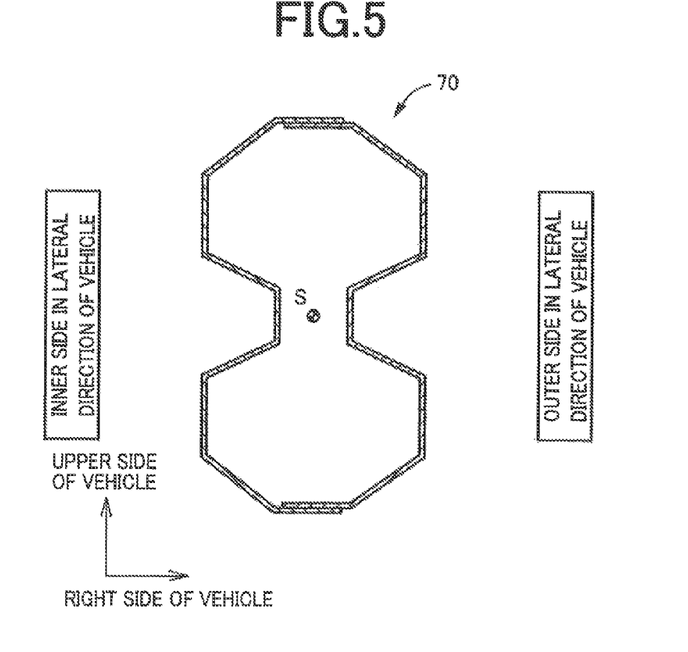
FIG. 5 is a sectional view corresponding to FIG. 2, illustrating a conventional crush box used in the offset crash test.
Figure 6:
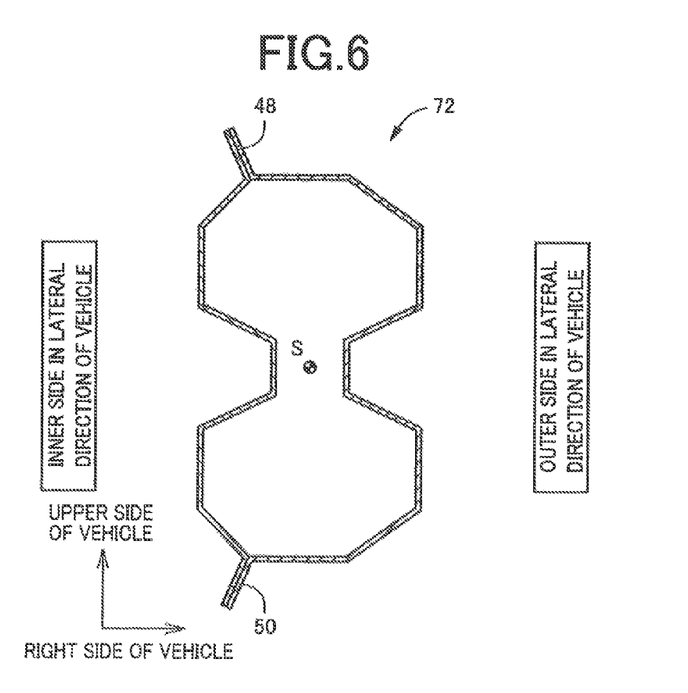
FIG. 6 is a sectional view corresponding to FIG. 2, illustrating a comparative product used in the offset crash test, in which a pair of flanges are provided along ridges located on the inner side in the lateral direction of the vehicle.

An offset crash test was carried out in which the right front part of a vehicle struck at a vehicle speed V1 a crash barrier 60 having a crash surface 62 tilted at a barrier angle γ as shown in FIG. 4, and characteristics of change in axial load and characteristics of absorbed energy with respect to a compression stroke of the crush box 10 were examined by FEM analysis. The result will be described below. In this crash test, the barrier angle γ is γ≈15°, and the vehicle speed V1 is V1≈16 km/h. In addition to the product of the present invention (the crush box 10), a conventional product 70 having no flanges 48, 50 as shown in FIG. 5, and a comparative product 72 having the flanges 48, 50 on the opposite side from the crush box 10 of the present invention, namely on the inner side in the lateral direction of the vehicle, as shown in FIG. 6, were also tested under the same conditions. The comparative product 72 of FIG. 6 can be regarded as the product of the present invention when used as a crush box on the left front part of the vehicle.

Figure 7:
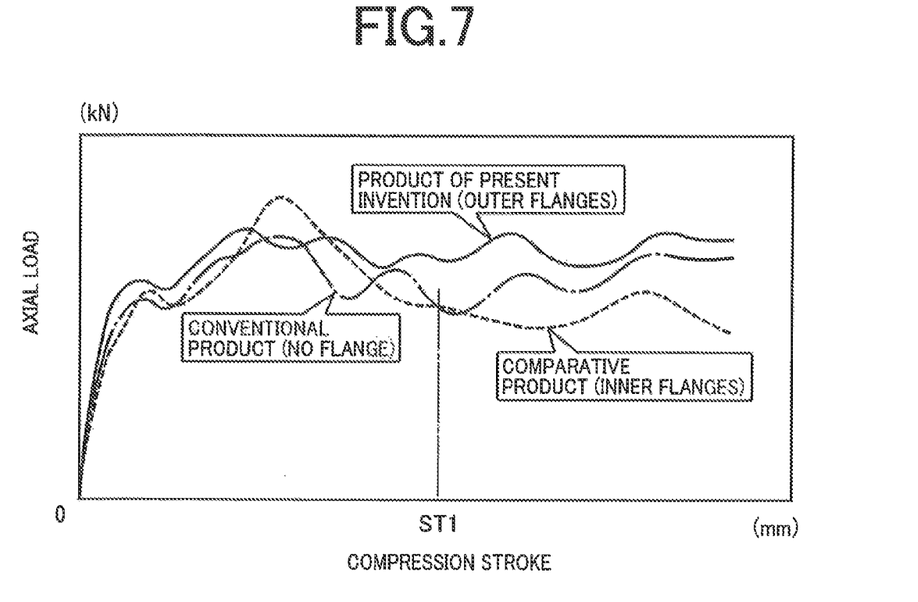
FIG. 7 is a diagram showing characteristics of change in axial load with respect to a compression stroke which were obtained by carrying out the offset crash test using the product of the present invention, the conventional product, and the comparative product, and by FEM analysis.
Figure 8:
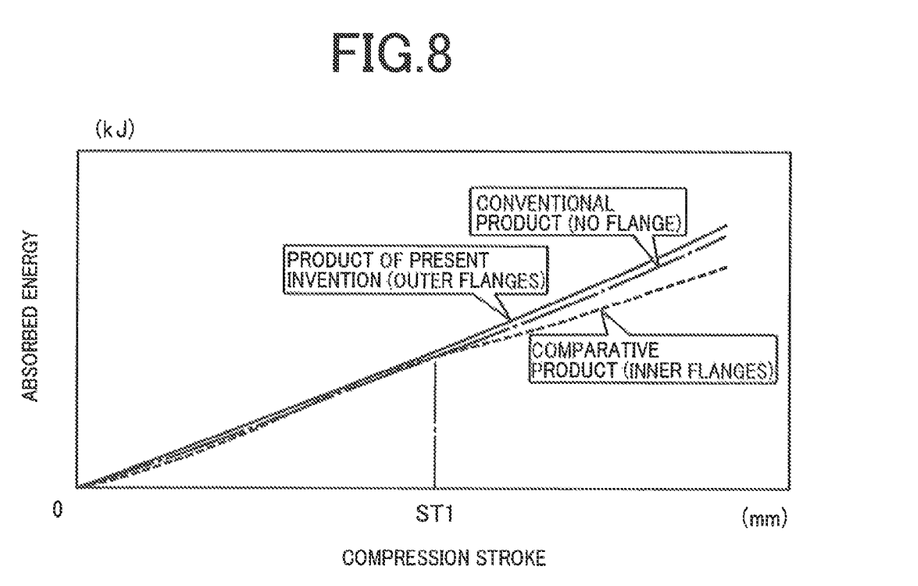
FIG. 8 is a diagram showing characteristics of absorbed energy which are obtained based on the characteristics of change in load shown in FIG. 7.

FIGS. 7 and 8 are diagrams showing comparison of the characteristics of the axial load and the absorbed energy with respect to the compression stroke respectively, for the product of the present invention, the comparative product, and the conventional product. The absorbed energy corresponds to an integral value of the axial load. As can be seen from these diagrams, the product of the present invention has excellent impact energy absorption capability as the axial load is relatively stable at a high level until the final stage of the crushing process and the absorbed energy is larger than that in the conventional product and the comparative product. The comparative product does not have sufficient impact energy absorption capability as it is laterally buckled near a compression stroke ST1 in the middle stage of the crushing and the axial load decreases.

The above test result will be examined with reference to FIGS. 9 and 10. FIGS. 9 and 10 are diagrams illustrating the load that is applied to the crush box as viewed from above. A point a is a support point on the base end side of the crush box, which is an outer support point located on the outer side in the lateral direction of the vehicle. A point b is a support point on the base end side of the crush box, which is an inner support point located on the inner side in the lateral direction of the vehicle. Loads F1, F2 are input loads that are applied to the surface located right in front of the support points a, b in the longitudinal direction of the vehicle. Based on these input loads F1, F2, moment loads Ma, Mb around the support points a, b are applied. The crush box is therefore subjected to a moment load in the counterclockwise direction (inward in the lateral direction of the vehicle) as a whole. Since the product of the present invention has the pair of flanges 48, 50 along the upper and lower ridges 40, 42 provided on the outer side in the lateral direction of the vehicle, the product of the present invention has higher rigidity in its outer part in the lateral direction of the vehicle, and the input load F1 on the right side becomes larger than the input load F2 on the left side. In particular, an axial component f1a of the input load F1 is increased. The axial component f1a is applied as a moment in the clockwise direction to the inner support point b in the lateral direction of the vehicle. This reduces the moment load Mb in the counterclockwise direction which is applied to the support point b, or results in the negative moment load Mb so that a moment load in the clockwise direction is applied to the support point b. The moment load Ma in the counterclockwise direction which is applied to the outer support point a in the lateral direction of the vehicle is somewhat increased by an increase in component f1p in a direction perpendicular to the axial direction. However, the change in component f1p is smaller than that in axial component f1a, and the influence of the axial component f1a increases as being closer to the support point b on the region between the support point a and the support point b. Accordingly, the moment load in the counterclockwise direction is reduced as a whole, whereby lateral buckling of the crush box is suppressed. On the other hand, the comparative product having the flanges 48, 50 on the inner side in the lateral direction of the vehicle has higher rigidity in its inner part in the lateral direction of the vehicle, and the input load F2 on the left side becomes larger than the input load F1 on the right side. The moment load in the counterclockwise direction is therefore increased as a whole, and lateral buckling of the crush box occurs more easily as compared to the conventional product.

Figure 11:
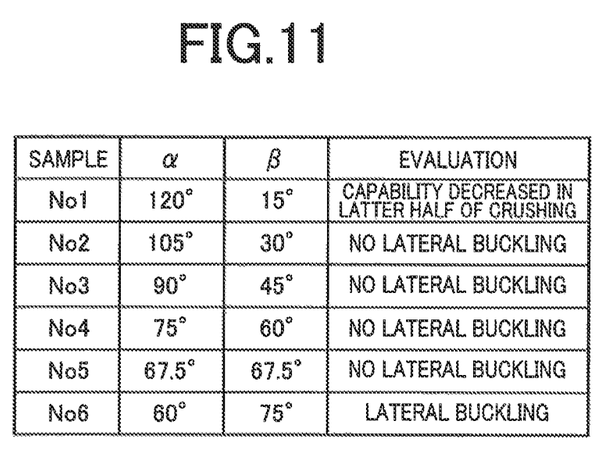
FIG. 11 is a diagram illustrating another test result of the offset crash test, showing the test result of six Samples No. 1 to No. 6 that are different from each other in angles α, β shown in FIG. 2.
Figure 12:
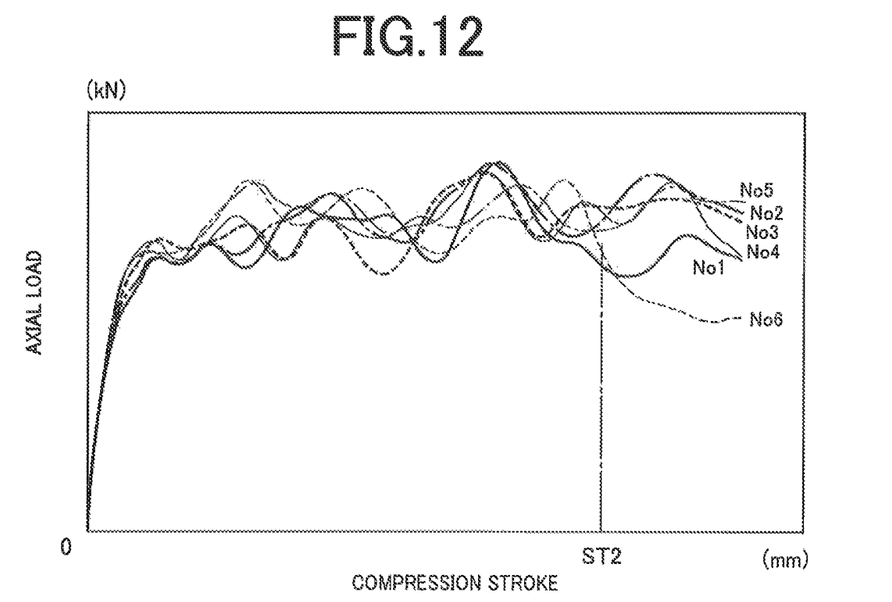
FIG. 12 is a diagram showing characteristics of change in axial load with respect to a compression stroke which were obtained by FEM analysis by carrying out the offset crash test using the six Samples No. 1 to No. 6 shown in FIG. 11.
Figure 13:
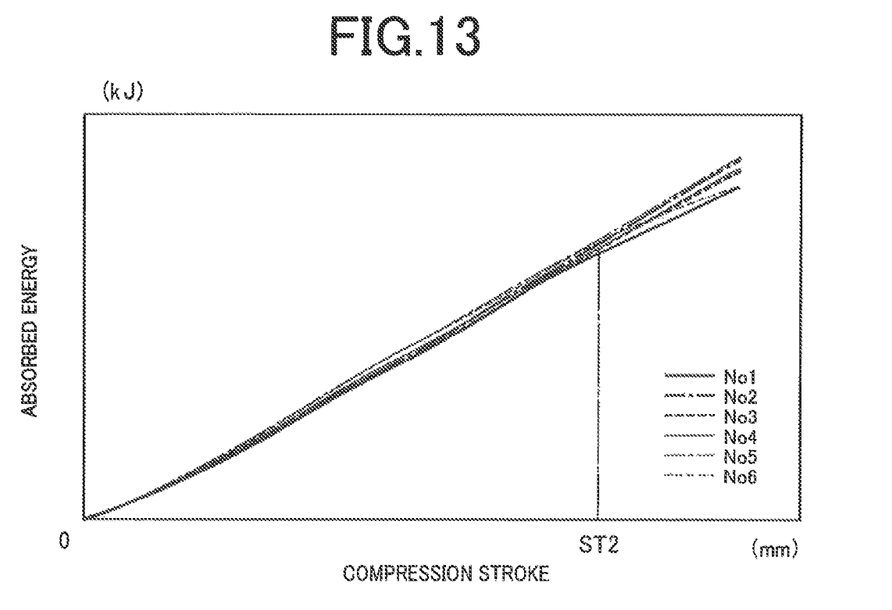
FIG. 13 is a diagram showing characteristics of absorbed energy which are obtained based on the characteristics of change in load shown in FIG. 12.

Six samples (the products of the present invention) No. 1 to No. 6 having different intersection angles α and different tilt angles β were prepared as shown in FIG. 11, and an offset crash test was carried out under the same conditions as those described above to examine characteristics of change in load and characteristics of absorbed energy by FEM analysis. The result shown in FIGS. 12 and 13 was obtained. Each of Samples No. 1 to No. 6 has relatively stable characteristics of change in load and thus has excellent impact energy absorption capability. However, Sample No. 6 (thin dashed line) having an intersection angle α of 60° was laterally buckled near a compression stroke ST2 in the final stage of the crushing. Regarding Sample No. 1 (thick solid line) having a tilt angle β of 15°, no obvious lateral buckling was observed, but the axial load and the impact energy absorption capability slightly decreased in the final stage of the crushing.

As described above, in the crush box 10 of the present embodiment, the flanges 48, 50 are provided along only the pair of outer ridges 40, 42 in the lateral direction of the vehicle out of the plurality of ridges of the tubular body 22 so as to extend along the entire axial length of the tubular body 22. The tubular body 22 therefore has higher rigidity against a compressive load in its outer part in the lateral direction of the vehicle. This reduces the moment load that is applied inward in the lateral direction of the vehicle and reduces the lateral buckling even in the case of an offset crash in which the impact load F is applied to the vehicle obliquely from the outside. Excellent impact energy absorption capability can therefore be stably obtained.

The tubular body 22 is formed by the pair of body halves 44, 46, and the pair of upper and lower flanges 48, 50 are provided at both ends of the pair of body halves 44, 46. The pair of upper and lower flanges 48, 50 are placed on each other and bonded together so as to project outward from the tubular body 22. The tubular body 22 having the plurality of flanges 48, 50 can therefore be easily produced at low cost by press work, welding, etc. In this case, the limitations on materials and shapes are less than those in the case where the tubular body 22 is produced by extrusion molding, and the material yield is improved as compared to the case where the flanges 48, 50 are fixedly attached later by welding etc.

Each of the upper and lower flanges 48, 50 has an angle of more than 60° with respect to the pair of sidewalls 35, 36 or 35, 37 adjoining each other with the ridge 40, 42 interposed therebetween, and is tilted outward in the lateral direction of the vehicle by 15° or more from the vertical line in the vertical direction of the vehicle. This can appropriately ensure impact energy absorption capability by crushing of the tubular body 22 and can improve resistance to lateral buckling of the crush box. That is, providing the pair of upper and lower flanges 48, 50 may hinder crushing of the tubular body 22 and thus may reduce impact energy absorption capability. However, since the flanges 48, 50 are provided at the above angles, the influence of the flanges 48, 50 on crushing characteristics of the tubular body 22 can be reduced.

The projecting dimension t of the plurality of flanges 48, 50 is constant along the entire axial length of the tubular body 22. This allows the tubular body 22 to have higher rigidity in its outer part in the lateral direction of the vehicle, and thus can appropriately improve the resistance to lateral buckling.

In the case where the tubular body 22 of the present embodiment has a flattened octagonal shape in section and has the grooves 32, 33 in the pair of right and left wide sidewalls 31, 30, the plurality of flanges 48, 50 are provided along the pair of ridges 40, 42 located outside the pair of narrow sidewalls 36, 37 at the upper and lower ends in the lateral direction of the vehicle. This can appropriately ensure impact energy absorption capability by crushing of the tubular body 22 and can improve the resistance to lateral buckling. That is, providing the plurality of flanges 48, 50 may hinder crushing of the tubular body 22 and thus may reduce impact energy absorption capability. However, since the flanges 48, 50 are provided along the ridges 40, 42 located at the upper and lower ends separated from the grooves 32, 33 to be involved in the crushing, the influence of the flanges 48, 50 on crushing characteristics of the tubular body 22 by the grooves 32, 33 can be reduced.

Although the embodiment of the present invention is described above in detail based on the drawings, the embodiment is shown by way of example only, and the present invention can be embodied in various modified or improved forms based on the knowledge of those skilled in the art.

NOMENCLATURE OF ELEMENTS

10: crush box 22: tubular body 30, 31: wide sidewalls 32, 33: grooves 34, 35: tilted sidewalls 36, 37: narrow sidewalls 40: upper outer ridge (outer ridge) 42: lower outer ridge (outer ridge) 44: inner body half 46: outer body half 48: upper flange (joint portion) 50: lower flange (joint portion) S: axis (axial direction) α: intersection angle β: tilt angle t: projecting dimension

The invention claimed is:

1. A crush box, which has a tubular body having a plurality of flat plate-shape sidewalls and having a polygonal shape in section, which is disposed in such an attitude that an axial direction of the tubular body matches a longitudinal direction of a vehicle, and which, when subjected to a compressive load in the axial direction, is crushed like an accordion in the axial direction to absorb impact energy, the crush box being configured such that a plurality of flanges projecting outward from the tubular body are provided along only a plurality of outer ridges located on an outer side in a lateral direction of the vehicle out of a plurality of ridges located along a boundary between the plurality of sidewalls, such that the plurality of flanges extend along an entire axial length of the tubular body, the tubular body is formed by a pair of body halves divided by a pair of upper and lower outer ridges located at upper and lower positions on the outer side in the lateral direction of the vehicle out of the plurality of ridges located along the boundary between the plurality of sidewalls, each of the pair of body halves has joint portions at its both ends located along the pair of upper and lower outer ridges, the joint portions are placed on each other and bonded together and project outward from the tubular body, and a pair of upper and lower flanges functioning as the plurality of flanges are formed by the joint portions, and the upper flange is provided so that the upper flange projects obliquely upward and outward in the lateral direction of the vehicle in section perpendicular to the axial direction of the tubular body, and the lower flange is provided so that the lower flange projects obliquely downward and outward in the lateral direction of the vehicle in section perpendicular to the axial direction of the tubular body.

2. The crush box according to claim 1, wherein
the upper flange has an angle of more than 60° with respect to each of a pair of sidewalls adjoining each other with the upper outer ridge interposed therebetween and is tilted outward in the lateral direction of the vehicle by 15° or more from a vertical line in a vertical direction of the vehicle, and
the lower flange has an angle of more than 60° with respect to each of a pair of sidewalls adjoining each other with the lower outer ridge interposed therebetween and is tilted outward in the lateral direction of the vehicle by 15° or more from the vertical line in a vertical direction of the vehicle.

3. The crush box according to claim 1, wherein
each of the upper and lower flanges has a constant projecting dimension along the entire axial length of the tubular body.

4. The crush box according to claim 1, wherein
the tubular body has, in section perpendicular to the axial direction of the tubular body, a flattened octagonal shape that is long in the vertical direction of the vehicle, and has a pair of wide sidewalls located on right and left sides in the lateral direction of the vehicle so as to be parallel to each other, and the pair of wide sidewalls have grooves that are symmetrically recessed inward of the tubular body and that extend parallel to the axial direction of the tubular body, and
the upper and lower outer ridges are a pair of ridges located outside a pair of narrow sidewalls in the lateral direction of the vehicle respectively, and the pair of narrow sidewalls are located at upper and lower ends of the tubular body having the octagonal shape in section and extend parallel to each other.

* * * * *